United States Patent
Esna Ashari Esfahani

(10) Patent No.: US 12,221,130 B2
(45) Date of Patent: Feb. 11, 2025

(54) SYSTEM FOR MOTION PLANNING WITH NATURAL LANGUAGE COMMAND INTERPRETATION

(71) Applicant: GM Global Technology Operations LLC, Detroit, MI (US)

(72) Inventor: Alireza Esna Ashari Esfahani, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 202 days.

(21) Appl. No.: 18/150,365

(22) Filed: Jan. 5, 2023

(65) Prior Publication Data

US 2024/0227845 A1 Jul. 11, 2024

(51) Int. Cl.
| | |
|---|---|
| B60W 60/00 | (2020.01) |
| B60W 40/02 | (2006.01) |
| G06F 40/30 | (2020.01) |
| G06V 20/58 | (2022.01) |

(52) U.S. Cl.
CPC .......... *B60W 60/001* (2020.02); *B60W 40/02* (2013.01); *G06F 40/30* (2020.01); *G06V 20/582* (2022.01); *B60W 2540/21* (2020.02)

(58) Field of Classification Search
CPC ............... B60W 60/001; B60W 40/02; B60W 2540/21; G06F 40/30; G06V 20/582
See application file for complete search history.

(56) References Cited

U.S. PATENT DOCUMENTS

| | | | |
|---|---|---|---|
| 10,372,130 B1 * | 8/2019 | Kaushansky | B60K 35/26 |
| 11,866,063 B2 * | 1/2024 | Almeida | G10L 15/22 |
| 2019/0042407 A1 * | 2/2019 | Gao | G06F 3/0688 |
| 2019/0163995 A1 * | 5/2019 | Govindaraj | G06V 20/582 |
| 2019/0295549 A1 * | 9/2019 | Oh | G06F 3/167 |
| 2022/0215159 A1 * | 7/2022 | Qian | G06F 40/40 |

* cited by examiner

*Primary Examiner* — Ramsey Refai
(74) *Attorney, Agent, or Firm* — Vivacqua Crane, PLLC

(57) ABSTRACT

A system for motion planning for a vehicle generates a rule with an associated condition criterion portion and a result portion. For each potential driving action of a set of potential driving actions of a vehicle, the system determines whether the potential driving action contradicts the result portion of the rule. A driving action mask is generated that includes a corresponding mask parameter. If the potential driving action contradicts the result portion of the rule, then the corresponding mask parameter acts to decrease a probability of selection of that potential driving action in a motion planning decision. The condition criterion portion is evaluated to determine whether the mask is applicable and if the mask is applicable, the driving action mask is used to determine a motion planning decision for the vehicle. A rule expiration criterion may also be evaluated to determine whether a rule is expired.

20 Claims, 8 Drawing Sheets

SYSTEM FOR MOTION PLANNING WITH NATURAL LANGUAGE COMMAND INTERPRETATION

INTRODUCTION

The present disclosure relates to systems and methods for motion planning for vehicles which incorporate interpretation of natural language commands, such as from traffic signs or vocal commands.

In autonomous vehicles, motion planning systems are generally designed to determine an optimal path for a vehicle to traverse a given environment while avoiding obstacles and obeying traffic laws. Motion planning systems may use sensors to gather data about objects (e.g., a remote vehicle, pedestrian, and/or structure) in the environment surrounding the vehicle. Using the data gathered about the objects in the environment and data about the vehicle (e.g., speed, acceleration, and/or steering angle), the motion planning system determines an optimal path for the vehicle and driving actions to achieve the optimal path. However, motion planning systems may not have the capability to interpret natural language commands, such as from traffic signs or voice commands, and integrate the interpretation with selection of driving actions.

Thus, while motion planning systems achieve their intended purpose, there is a need for a new and improved system and method for motion planning for a vehicle that interprets natural language commands and integrates the interpretation with a motion planner module using reinforcement learning to aid in a motion planning decision.

SUMMARY

According to several aspects, a system for motion planning for a vehicle is disclosed. The system includes a computer with a processor and a memory. The memory includes instructions such that the processor is programmed to analyze text data representing a natural language command related to an environment of the vehicle to generate a rule with an associated condition criterion portion and a result portion. The processor is programmed to determine, for each potential driving action of a set of potential driving actions of the vehicle, whether the potential driving action contradicts the result portion of the rule and generate a driving action mask that includes, for each potential driving action of the set of potential driving actions of the vehicle, a corresponding mask parameter, wherein, if the potential driving action contradicts the result portion of the rule, then the corresponding mask parameter acts to decrease a probability of selection of that potential driving action in a motion planning decision. The condition criterion portion is evaluated to determine whether the mask is applicable. If the mask is applicable, then the driving action mask is used to determine a motion planning decision for the vehicle.

In another aspect, the processor is further programmed to generate a rule expiration criterion for the rule and determine, prior to evaluating the condition criterion portion, whether the rule is expired using the rule expiration criterion, wherein the condition criterion portion is not evaluated if the rule is expired.

In another aspect, the processor is further programmed to store the rule in a database with a corresponding time and location stamp and an information source to be queried to acquire expiration information relevant to the rule expiration criterion; and wherein to determine whether the rule is expired includes querying the information source to obtain the expiration information.

In another aspect, the processor is further programmed to store a plurality of rules in the database, wherein each rule of the plurality of rules includes a corresponding rule expiration criterion and is stored with a corresponding time and location stamp and a corresponding classification parameter to indicate a corresponding information source to be queried to acquire expiration information relevant to the corresponding rule expiration criterion, wherein an information source is a module that indicates a current time, a module that indicates a current location of the vehicle, or a module that detects a superseding command. For each rule of the plurality of rules, the processor is programmed to monitor corresponding rule expiration criterion on an ongoing basis to determine whether the rule is expired, wherein to determine whether a rule is expired includes querying the corresponding information source indicated by the corresponding classification parameter to obtain corresponding expiration information.

In another aspect, the condition criterion portion is classified according to an information source to be queried to acquire condition information to evaluate the condition criterion portion, wherein an information source to be queried includes a module for determining a vehicle location, a map, a vehicle occupant, or a module of the vehicle interpreting a sensor signal, and wherein the processor is further programmed to query the information source to evaluate the condition criterion portion to determine whether the mask is applicable.

In another aspect, the processor is further programmed to receive, from a vehicle sensor, sign image data representing a traffic sign in the environment of the vehicle and analyze the sign image data to generate the text data.

In another aspect, the processor is further programmed to receive, from a vehicle sensor, voice data representing a voice command from a vehicle occupant and generate the text data from the voice data, wherein at least one of the text data and the rule is confirmed by querying the vehicle occupant.

In another aspect, using the driving action mask to determine a motion planning decision for the vehicle includes using a reinforcement learning algorithm to select an optimal driving action from the set of potential driving actions for the vehicle and wherein the vehicle is operated according to the selected optimal driving action.

In another aspect, the set of potential driving actions for the vehicle includes at least one of: a park action, a stop action, a turn right action, a turn left action, a drive straight action, an increase vehicle speed action, and a decrease vehicle speed action.

In another aspect, a system for motion planning is disclosed. The system includes a computer including a processor and a memory. The memory includes instructions such that the processor is programmed to receive text data representing a natural language command related to an observation space of the vehicle from a traffic sign or vocal command and analyze the text data to generate a rule and a rule expiration criterion, wherein the rule includes a condition criterion portion and a result portion. The processor is programmed to determine, for each potential driving action of a set of potential driving actions of the vehicle, a corresponding contradiction probability related to whether the potential driving action contradicts the result portion of the rule and generate a driving action mask that includes, for each potential driving action of the set of potential driving actions of the vehicle, a corresponding mask parameter based on the corresponding contradiction probability of the potential driving action. The rule expiration criterion is evaluated to determine whether the rule is not expired and the condition criterion portion is evaluated to determine whether the mask is applicable. If the rule is not expired and the mask is applicable, then the generated driving action mask is communicated to a neural network module to select an optimal driving action from the set of potential driving actions for the vehicle using the driving action mask.

In another aspect, the processor is further programmed to supervise an algorithm for generating logical command information from voice commands of a user by generating corresponding first logical command data and providing the user an opportunity to verify or correct the first logical command data.

In another aspect, the processor is further programmed to initialize an algorithm for generating logical command information from voice commands of a user by using a set of concepts related to a set of saved commands each with corresponding saved logical command information, wherein for each concept of the set of concepts, the user is instructed to express the concept as a voice command and the algorithm generates a first logical command data by analyzing the voice command from the user, and the first logical command data is compared to the saved logical command information for the concept.

In another aspect, a method for motion planning for a vehicle includes analyzing text data representing a natural language command related to an environment of the vehicle to generate a rule with an associated condition criterion portion and a result portion. The method further includes determining, for each potential driving action of a set of potential driving actions of the vehicle, whether the potential driving action contradicts the result portion of the rule and generating a driving action mask that includes, for each potential driving action of the set of potential driving actions of the vehicle, a corresponding mask parameter, wherein, if the potential driving action contradicts the result portion of the rule, then the corresponding mask parameter acts to decrease a probability of selection of that potential driving action in a motion planning decision. The condition criterion portion is evaluated to determine whether the mask is applicable and if the mask is applicable, the driving action mask is used to determine a motion planning decision for the vehicle.

In another aspect, the method further includes generating a rule expiration criterion for the rule and determining, prior to evaluating the condition criterion portion, whether the rule is expired using the rule expiration criterion, wherein the condition criterion portion is not evaluated if the rule is expired.

In another aspect, the method further includes storing the rule in a database with a corresponding time and location stamp and an information source to be queried to acquire expiration information relevant to the rule expiration criterion and querying the information source to obtain the expiration information.

In another aspect, the method further includes storing a plurality of rules in the database, wherein each rule of the plurality of rules includes a corresponding rule expiration criterion and is stored with a corresponding time and location stamp and a corresponding classification parameter to indicate a corresponding information source to be queried to acquire expiration information relevant to the corresponding rule expiration criterion. An information source is a module that indicates a current time, a module that indicates a current location of the vehicle, or a module that detects a superseding command. The method includes monitoring, for each rule of the plurality of rules, the corresponding rule expiration criterion on an on-going basis to determine whether the rule is expired, including querying the corresponding information source indicated by the corresponding classification parameter to obtain corresponding expiration information.

In another aspect, the condition criterion portion is classified according to an information source to be queried to acquire condition information to evaluate the condition criterion portion, wherein an information source to be queried includes a module for determining a vehicle location, a map, a vehicle occupant, or a module of the vehicle interpreting a sensor signal, and wherein the processor is further programmed to query the information source to evaluate the condition criterion portion to determine whether the mask is applicable.

In another aspect, the method further includes receiving, from a vehicle sensor, sign image data representing a traffic sign in the environment of the vehicle and analyzing the sign image data to generate the text data.

In another aspect, the method further includes receiving, from a vehicle sensor, voice data representing a voice command from a vehicle occupant and generating the text data from the voice data, wherein at least one of the text data and the rule is confirmed by querying the vehicle occupant.

In another aspect, the method includes using the driving action mask to determine a motion planning decision for the vehicle includes using a reinforcement learning algorithm to select an optimal driving action from the set of potential driving actions for the vehicle. The vehicle is operated according to the selected optimal driving action.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

To make an appropriate motion planning decision for an autonomous or semi-autonomous vehicle and/or to supplement advanced driver-assistance systems (ADAS) of a vehicle, the present disclosure provides a vehicle equipped with a motion planning system that can interpret text data related to natural language commands. In general, a motion planning system accounts for a variety of factors and conditions related to the vehicle to make motion planning decisions including selection of optimal driving actions for the vehicle from a predefined set of driving actions or action space. Advantageously, the motion planning system of the present disclosure provides for the interpretation and analysis of actionable natural language commands, such as commands from traffic signs and/or voice commands from a vehicle occupant, by translating text data associated with the actionable command to logical command information and then analyzing the logical command information to provide suitable masking of certain driving actions that contradict the command.

Vehicle sensors, such as cameras and microphones, may be used to acquire image data from traffic signs and speech data from vehicle operator voice commands, wherein the image data and speech data may be analyzed to extract text data. Tools to detect and interpret natural language, such as the language of traffic signs and voice commands, can be used to translate the text data to a format that may be used by the motion planning system to aid in selection of appropriate driving actions. For example, the text data may be analyzed to determine a logical command (also referred to as a rule herein) that is a logical version of the natural language command and other information associated with the logical command, such as a rule expiration criterion. The rule includes a condition criterion portion and a result portion. The logical command information is further analyzed by the system. Each potential driving action in the action space of the motion planner can be compared to the result portion of the rule to determine whether contradictions exist. A mask is generated based on determined contradictions. The condition criterion portion may be evaluated to determine whether the mask is applicable, and the generated mask is used by the deep neural network (DNN) 400 (shown in FIG. 4), such as when the rule is not expired and/or a condition criterion portion of the rule is satisfied and the mask is applicable, to decrease the probability of, or prevent selection of, potential driving actions that are contrary to the traffic sign or voice command. This system is scalable such that multiple actionable natural language commands from traffic signs or voice commands can be handled by the motion planning system.

Figure 1:
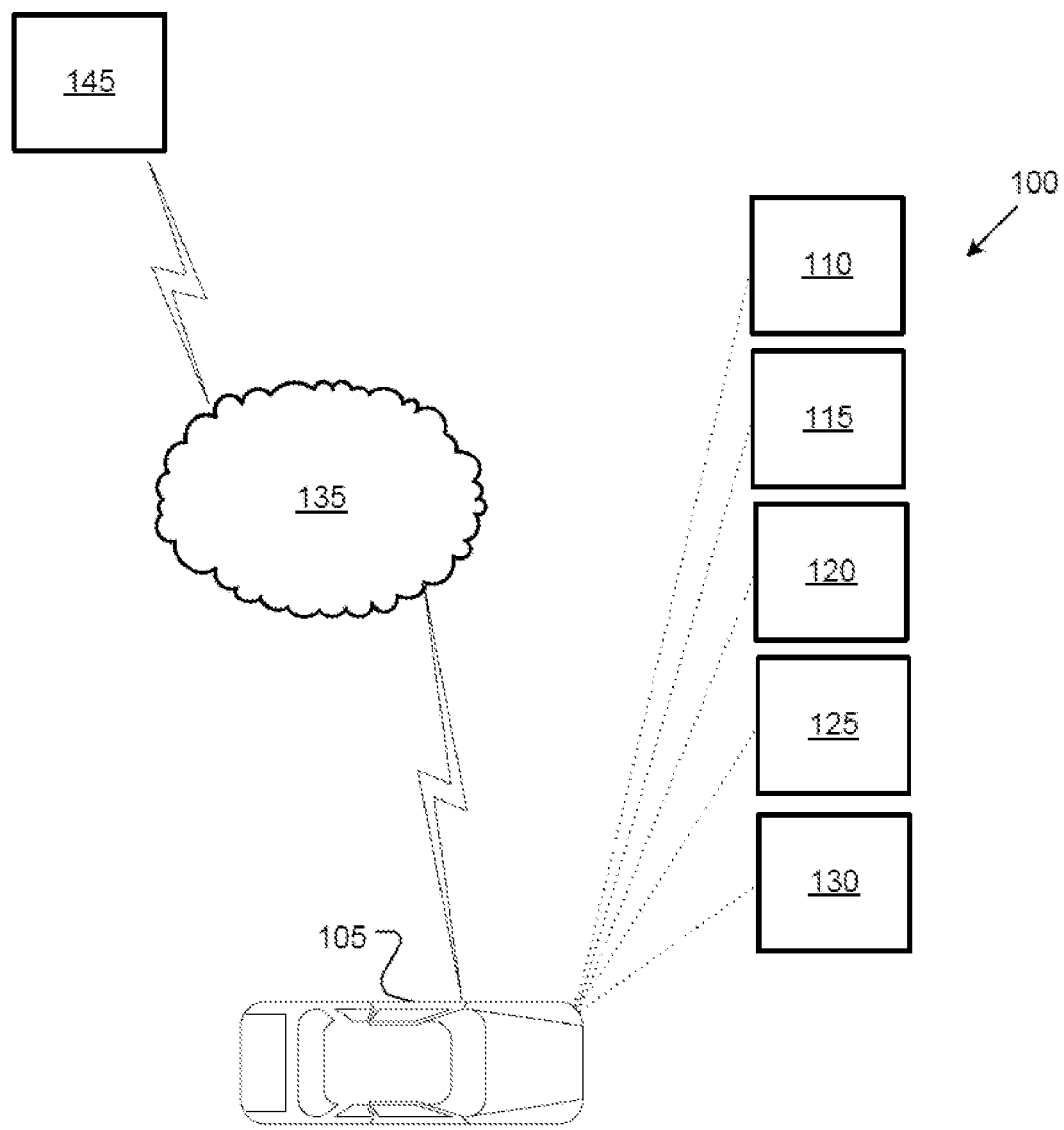
FIG. 1 is a block diagram of an example system including a vehicle.

FIG. 1 is a block diagram of an example vehicle system 100. The system 100 includes a vehicle 105, which can comprise a land vehicle such as a car, truck, etc., an aerial vehicle, and/or an aquatic vehicle. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 may operate a vehicle 105 in an autonomous mode, a semi-autonomous mode, or a non-autonomous (manual) mode. For purposes of this disclosure, an autonomous mode is defined as one in which each of vehicle 105 systems for propulsion, braking, and steering are controlled by the computer 110; in a semi-autonomous mode the computer 110 controls one or two of vehicle 105 systems for propulsion, braking, and steering; in a non-autonomous mode a human operator controls each of vehicle 105 systems for propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc.

Further, the computer 110 may communicate, via the vehicle 105 communications module 130, with a navigation system such as a global navigation satellite system (GNSS) that uses the Global Position System (GPS) coordinates. The GNSS is used to determine a geographical location of the vehicle on a map, where the data may be in a known form, e.g., geo-coordinates (latitudinal and longitudinal coordinates). In examples, the GNSS includes a GNSS receiver antenna (not shown) and a GNSS controller (not shown) in electrical communication with the GNSS receiver antenna. The GNSS receiver antenna receives signals from a plurality of satellites, and the GNSS controller calculates the geographical location of the vehicle based on the signals received by the GNSS receiver antenna. The GNSS may also include a map. The map may include information about infrastructure such as municipality borders, roadways, railways, sidewalks, buildings, and the like. Therefore, the geographical location of the vehicle may be contextualized using the map information. The map may also include information, such as, for example, road type, road width, road markings (e.g., lane edges), road signage (e.g., road signs and traffic signals), road speed limit, road weather condition, and road lighting condition, and the like.

The computer 110 is generally arranged for communications on the vehicle 105 communications module 130 and with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively, or additionally, in cases where the computer 110 comprises a plurality of devices, the vehicle 105 communications network may be used for communications between devices represented as the computer 110 in this disclosure. Further, as mentioned below, various controllers and/or vehicle sensors 115 may provide data to the computer 110. The vehicle 105 communications network can include one or more gateway modules that provide interoperability between various networks and devices within the vehicle 105, such as protocol translators, impedance matchers, rate converters, and the like.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles 106), etc., relative to the location of the vehicle 105. The vehicle sensors 115 may further include one or more camera sensor(s) 115, e.g., front view, side view, rear view, etc., providing image data from a field of view inside and/or outside the vehicle 105, such as to capture one or more traffic signs. The vehicle sensors 115 may include one or more microphones to sense voice commands and provide sound data.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle to vehicle (V2V) or vehicle-to-infrastructure (V2X) wireless communications to another vehicle, to (typically via the network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short-range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

A computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, traffic sign, rock, pothole, bicycle, motorcycle, etc., as well as physical features of objects. The language on traffic signs can be determined from image data. The language of speech can be determined from sound data. Natural language commands can be identified and analyzed.

Figure 3:
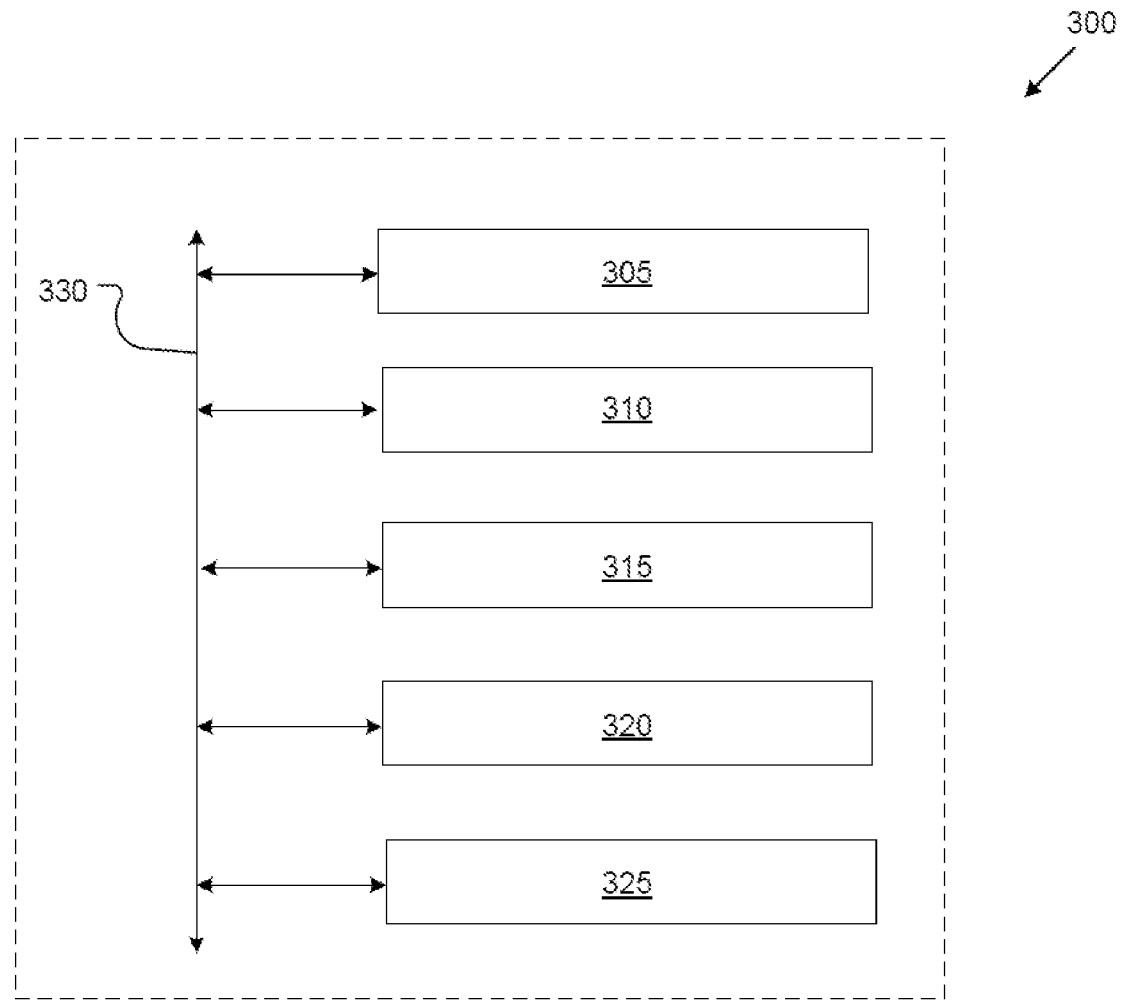
FIG. 3 is a block diagram of an example computing device.

FIG. 3 illustrates an example computing device 300 i.e., computer 110 and/or server(s) 145, which may be configured to perform one or more of the processes described herein. As shown, the computing device can comprise a processor 305, memory 310, a storage device 315, an I/O interface 320, and a communication interface 325. Furthermore, the computing device 300 can include an input device such as a touchscreen, mouse, keyboard, etc. In certain implementations, the computing device 300 can include fewer or more components than those shown in FIG. 3.

In some implementations, processor(s) 305 includes hardware for executing instructions, such as those making up a computer program. As an example, and not by way of limitation, to execute instructions, processor(s) 305 may retrieve (or fetch) the instructions from an internal register, an internal cache, memory 310, or a storage device 315 and decode and execute them.

The computing device 300 includes memory 310, which is coupled to the processor(s) 305. The memory 310 may be used for storing data, metadata, and programs for execution by the processor(s). The memory 310 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 310 may be internal or distributed memory.

The computing device 300 includes a storage device 315 that includes storage for storing data or instructions. As an example, and not by way of limitation, storage device 315 can comprise a non-transitory storage medium described above. The storage device 315 may include a hard disk drive (HDD), flash memory, a Universal Serial Bus (USB) drive, or a combination of these or other storage devices.

The computing device 300 also includes one or more input or output ("I/O") devices/interfaces 320, which are provided to allow a user to provide input to (such as user strokes), receive output from, and otherwise transfer data to and from the computing device 300. These I/O devices/interfaces 320 may include a mouse, keypad or a keyboard, a touch screen, camera, optical scanner, network interface, modem, microphone, speaker, and other known I/O devices or a combination of such I/O devices/interfaces 320. The touch screen may be activated with a writing device or a finger.

The I/O devices/interfaces 320 may include one or more devices for presenting output to a user, including, but not limited to, a graphics engine, a display (e.g., a display screen), one or more output drivers (e.g., display drivers), one or more audio speakers, and one or more audio drivers. In certain implementations, devices/interfaces 320 are configured to provide graphical data to a display for presentation to a user. The graphical data may be representative of one or more graphical user interfaces and/or any other graphical content as may serve a particular implementation.

The computing device 300 can further include a communication interface 325. The communication interface 325 can include hardware, software, or both. The communication interface 325 can provide one or more interfaces for communication (such as, for example, packet-based communication) between the computing device and one or more other computing devices 300 or one or more networks. As an example, and not by way of limitation, communication interface 325 may include a network interface controller (NIC) or network adapter for communicating with an Ethernet or other wire-based network or a wireless NIC (WNIC) or wireless adapter for communicating with a wireless network, such as a WI-FI. The computing device 300 can further include a bus 330. The bus 330 can comprise hardware, software, or both that couples components of computing device 300 to each other.

As described in greater detail herein, the computing device 300 and/or computer 110 are configured to implement a motion planning system that may use a neural network-based reinforcement learning algorithm. The computer 110 generates a set of action values, for example, one or more driving action probabilities, as outputs for an observed input state. The computer 110 can select an action corresponding to a maximum action value, e.g., the highest action value. The computer 110 obtains sensor data from the sensors 115 which corresponds to an observed input state and the computer 110 may interpret and/or analyze the sensor data.

Figure 2:
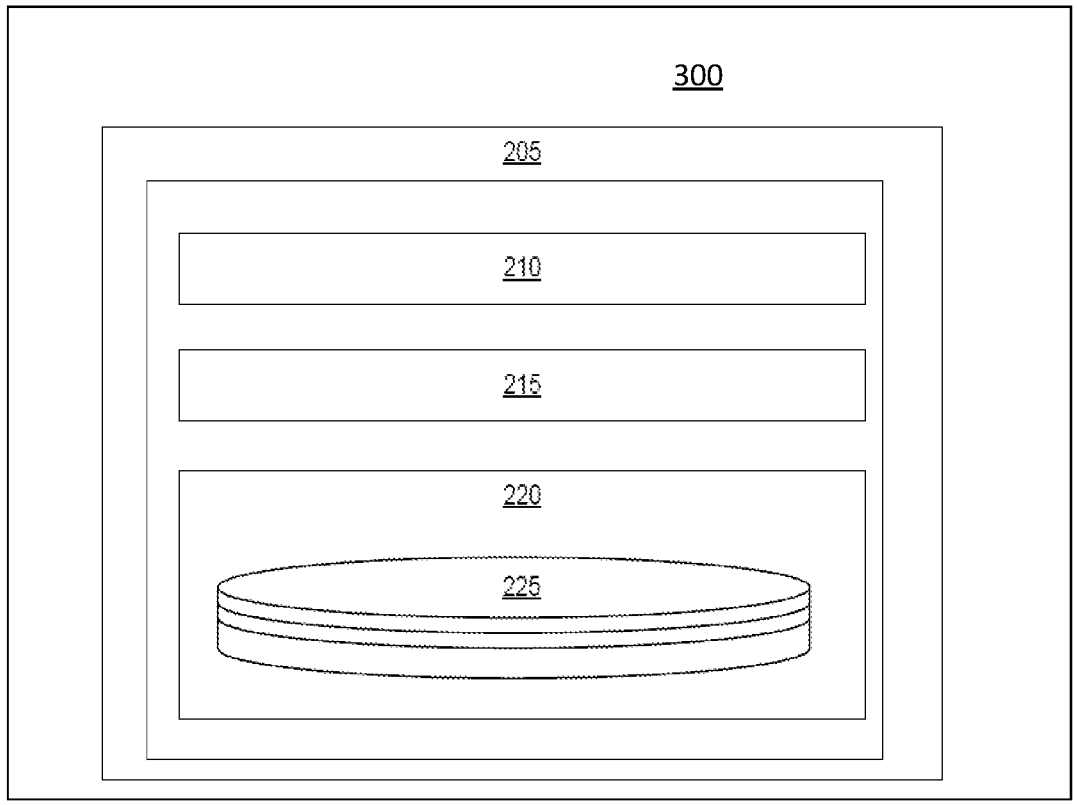
FIG. 2 is a block diagram of an example server within the system.

FIG. 2 illustrates computing device 300 with an example reinforcement learning (RL) module 205. RL module 205, together with the modules shown in FIG. 5A, implement a motion planning system. As shown, the RL module 205 may include a reinforcement learning (RL) agent component 210, one or more RL agents 215, and a storage component 220. The one or more RL agents 215 interact with an environment by performing actions that are selected by the reinforcement learning algorithm in response to receiving observations that characterize the current state of the environment.

The RL agent component 210 can manage, maintain, train, implement, utilize, or communicate with the one or more RL agents 215. For example, the RL agent component 210 can communicate with the storage component 220 to access one or more RL agents 215. The RL agent component 210 can also access data specifying a number of learner policies and/or rewards for training purposes, such as from storage device 225.

Figure 4:
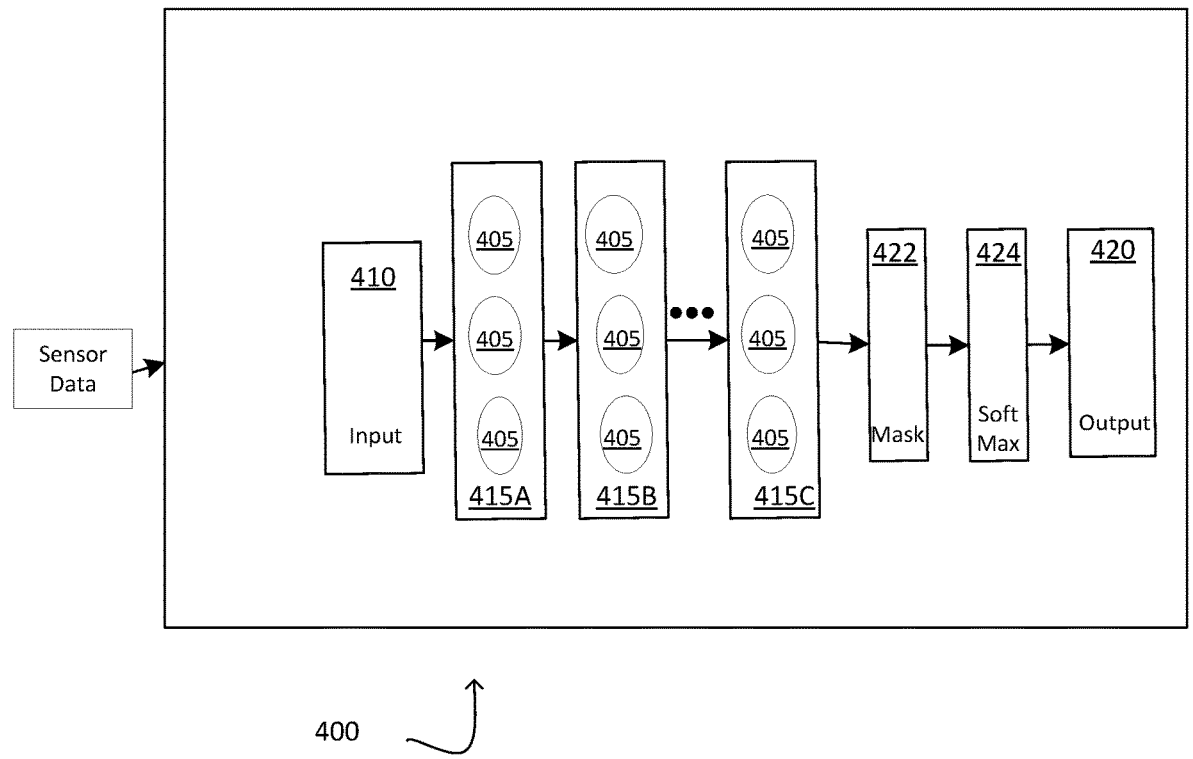
FIG. 4 is a diagram of an example neural network using reinforcement learning and incorporating a mask layer in a selection process for selecting appropriate driving actions to operate a vehicle.

FIG. 4 is a diagram of an example deep neural network (DNN) 400 that may form a part of the motion planning system, wherein the motion planning system includes a predetermined set of potential driving actions for the vehicle. The motion planning system may be implemented using reinforcement learning (RL), using the DNN 400 (e.g. agent 215 of FIG. 2) and a reward function. Reinforcement learning is a form of goal-directed machine learning. For example, an agent 215 (FIG. 2) can learn from direct interaction with its environment without relying on explicit supervision and/or complete models of the environment. Reinforcement learning is a framework modeling the interaction between a learning agent and its environment in terms of states, actions, and rewards. At each time step, an agent receives a state, selects an action based on a policy, receives a scalar reward, and transitions to the next state. The state can be based on one or more sensor inputs indicative of the environment. The agent's goal is to maximize an expected cumulative reward. The agent may receive a positive scalar reward for a positive action and a negative scalar reward for a negative action. Thus, the agent "learns" by attempting to maximize the expected cumulative reward. The reinforcement learning algorithm acts to select optimal driving actions from a predefined set of driving actions (action space) according to inputs such as various measurements by vehicle sensors related to an environment of the vehicle (observation space).

Within the present context, the DNN 400 may include one or more layers. As shown, the DNN 400 includes an input layer 410, one or more hidden layers 415A, 415B, 415C, and an output layer 420, with each layer having multiple nodes 405. While FIG. 4 illustrates three (3) hidden layers 415, it is understood that the DNN 400 can include additional or fewer hidden layers. The input and output layers 410, 420 may also include more than one node 405.

The nodes 405 are sometimes referred to as artificial neurons, because they are designed to emulate biological, e.g., human, neurons. A set of inputs to each node 405 are each multiplied by respective weights. The weighted inputs can then be summed in an input function to provide, possibly adjusted by a bias, a net input. The net input can then be provided to an activation function, which in turn provides a connected node 405 an output. The activation function can be a variety of suitable functions, typically selected based on empirical analysis. Node 405 outputs can then be provided for inclusion in a set of inputs to one or more neurons in a next layer.

The DNN 400 can be trained to accept sensor data as input and generate an output-action, based on the input. The DNN 400 can be trained with training data, e.g., a known set of sensor inputs and outputs and the computed rewards, to train the agent for the purposes of determining an optimal policy, such as an optimal driving action. In one or more implementations, the DNN 400 is trained via the server 145, and the trained DNN 400 can be transmitted to the vehicle 105 via the network 135. Weights can be initialized by using a Gaussian distribution, for example, and a bias for each neuron 405 can be set to zero. Training the DNN 400 can include updating weights and biases via suitable techniques such as back-propagation with optimizations.

During operation, the computer 110 obtains sensor data from the sensors 115 and provides the data as input to the DNN 400, e.g., the RL agent(s) 215. Once trained, the RL agent 215 can accept the sensor input and provide, as output, one or more action values based on the sensed input. During execution of the RL agent 215, action probabilities can be generated for each action available to the agent within the environment. In an example implementation, the RL agent 215 is trained according to a baseline policy. The baseline policy can include one or more action values corresponding to a set of sensor input data corresponding to a baseline driving environment.

In other words, once a RL agent 215 has been trained, it generates output data reflective of its decisions to take particular actions in response to particular input data. Input data includes, for example, values of a plurality of state variables relating to an environment being explored by the RL agent 215 or a task being performed by the RL agent 215. In some cases, one or more state variables may be one-dimensional. In some cases, one or more state variables may be multi-dimensional. A state variable may also be referred to as a feature. The mapping of input data to output data may be referred to as a policy and governs decision-making of the RL agent 215. A policy may, for example, include a probability distribution of particular actions given particular values of state variables at a given time step.

The DNN 400 also includes a mask layer 422. Adding a mask layer 422 to the DNN 400 allows for modification of a probability distribution from layer 415C for the predetermined set of potential driving actions based on selection and use of different masks. For example, the mask layer 422 may have a predetermined default mask that does not change an output of layer 415C under default conditions. The predetermined default mask can be changed if certain conditions are met to take into account an actionable command. For example, an actionable natural language command can be translated to a rule (logical command). A mask can be generated to reflect the rule and the generated mask can be used in the mask layer 422 provided that the rule is not expired and the mask is applicable, i.e., a condition criterion portion for the rule is satisfied, as more fully explained below.

A generated mask includes a mask parameter corresponding to each of the potential driving actions of the action space, such that, for example, a multiplication of each mask parameter with a probability associated with the potential driving action from the previous layer (e.g., layer 415C) provides a modified probability distribution output from the mask layer 422. For example, a predetermined set of potential driving actions for the vehicle may include a park action, a stop action, a turn right action, a turn left action, a drive straight action, an increase vehicle speed action, and a decrease vehicle speed action, and the like. This predetermined set is merely a non-limiting example and many other driving actions are possible. Corresponding probabilities of certain driving actions of the set of predetermined driving actions can be modified based on the mask used in the mask layer 422, with the mask being generated by interpreting an actionable natural language command. The generated mask may operate to decrease (or reduce to zero) a selection probability of one or more identified potential driving actions that contradict or conflict with the result portion of a rule as compared to not using the generated mask in mask layer 422.

An output from the mask layer 422 is sent to the softmax function 424, wherein a probability distribution of the set of predetermined driving actions is expressed as a normalized exponential function, wherein a sum of each probability score for the driving actions in the set of potential driving actions is equal to 1. The softmax function outputs the normalized exponential function to the output module. At the output module 410, one or more optimal driving actions are selected, such as according to a highest probability. After a driving action is selected by the motion planning system, the vehicle is then operated according to the selected driving action.

As an example, a traffic sign such as a "No Parking" sign will have a corresponding mask that reduces a probability of, or prevents, a Park Here potential driving action from being selected by the motion planning system if the vehicle is at the location where the sign is applicable. A traffic sign such as a "No Turn on Red" sign will have a corresponding mask that reduces a probability of or prevents selection of (depending on the form of the mask) a right turn driving action and a left turn driving action, provided that the vehicle is at the location of the sign (e.g., the sign is not expired) and provided that the traffic light is still red (e.g., the condition criterion portion is satisfied).

Figure 5A:
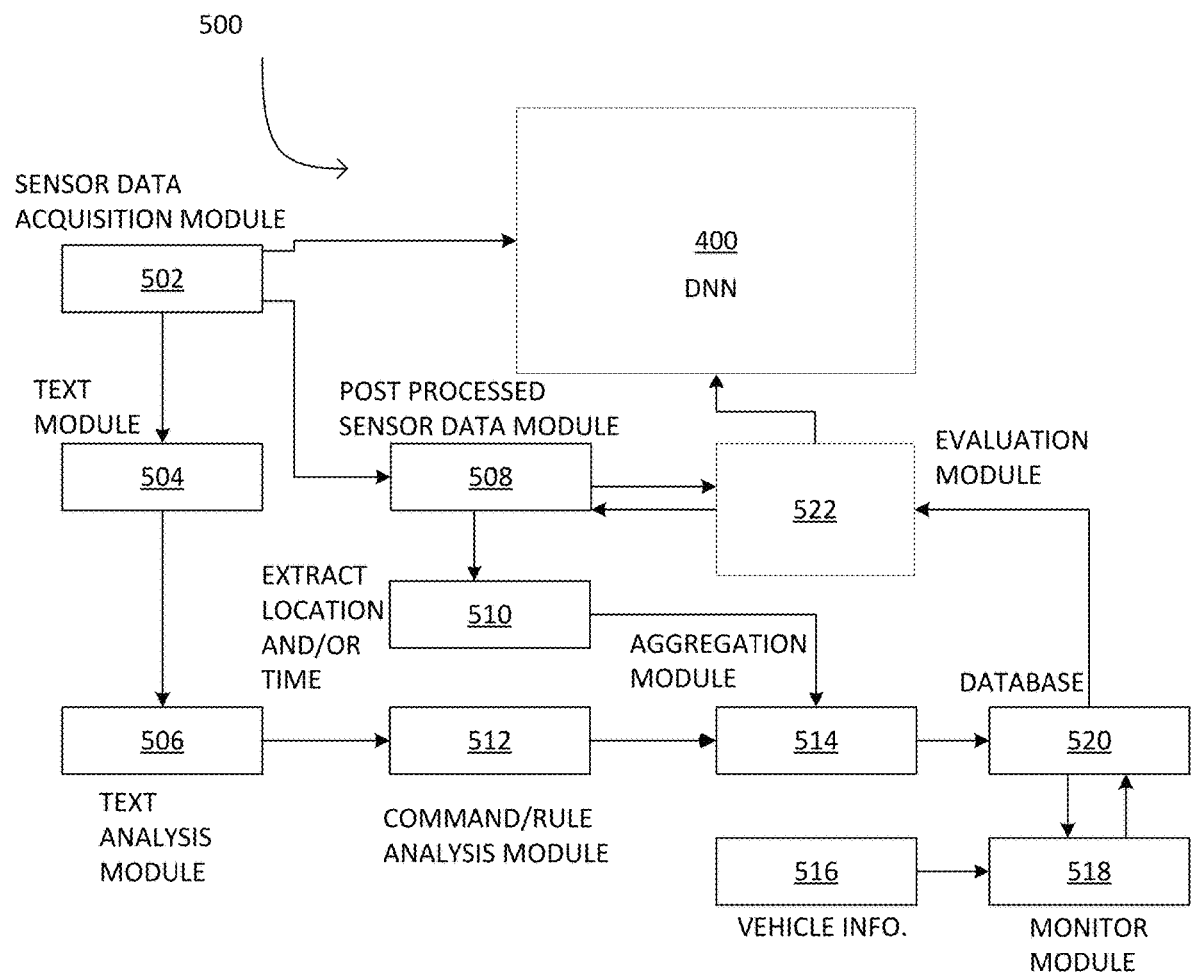
FIG. 5A is a block diagram illustrating example components of a system for motion planning using reinforcement learning.

FIG. 5A is a system diagram illustrating functional components of an example system for motion planning that is capable of natural language interpretation of traffic signs and voice commands and mask generation to reduce or filter driving actions in a motion planning decision which are contradictory to the command.

Sensor data acquisition module 502 receives vehicle sensor data, which may be provided as input to DNN 400 to determine a motion planning decision including desired driving actions for controlling motion of the vehicle. Vehicle sensor data representing actionable commands, such as traffic sign image data or voice command signals, is also provided to text module 504. Post processed sensor data module 508 may receive a location and/or a time associated with each actionable command as well as other data. Module 510 extracts the location and/or time data correlated to the appropriate natural language command and corresponding rule.

At module 504, text data representing an actionable natural language command is received or determined, such as by using the vehicle sensor data. Sign image data may be analyzed to determine the text data. A speech to text converter may be used to determine text data associated with voice commands. The text data may be analyzed to determine whether the command is an actionable command. Various known tools exist for national language processing and language interpretation. For example, probabilistic language models, or language models based on deep-learning such as transformer-based methods can be used, such as BERT, which is a known open-source machine learning framework for natural language processing (NLP). BERT is designed to understand the meaning of ambiguous language in text by using surrounding text to establish context. ROBERTa is an extension/improvement of BERT.

If actionable, the text data is analyzed to interpret the meaning of the text data at module 506, which operates to convert the text data into a rule (logical command) for each natural language command using rule-based algorithms or generative language models. Generated rules can be expressed as if/then clauses or in the form of a hypothesis/result. For example, for a "No Turn on Red" sign, a generated if-then clause is: if the traffic light is red, then no right turn. The "if" part of the if/then clause is the condition criterion portion of the rule, and the "then" part of the if/then clause is the result portion of the rule. Module 506 may also determine a corresponding rule expiration criterion (period of validity) for each rule, wherein a rule is expired if the rule expiration criterion is satisfied. Thus, each actionable natural language command has corresponding logical command information generated for it, where the logical command information includes a corresponding rule with a condition criterion portion of the rule and a result portion of the rule, and a corresponding rule expiration criterion.

At module 512, each actionable command/rule can be further analyzed to extract additional information. For example, an information source to evaluate a condition criterion portion of each rule may be identified by module 512. The information source providing condition information may be classified based on a type of source to use when evaluating the condition criterion portion (which occurs in module 522). For example, for a "No Turn on Red" traffic sign, the condition criterion portion of the corresponding rule can be evaluated by determining whether a traffic light associated with the sign is red. The type of source for evaluation of the condition criterion portion is then an image of the traffic light (such as from a vehicle camera) and a classification of the information source is an image or perception of the environment. An information source to be queried may include GPS or GPSS information, a map, a vehicle occupant, or a module of the vehicle interpreting a sensor signal, or the like. In some cases, a condition criterion portion may be paraphrased to rephrase and generate an appropriate voice query for a vehicle occupant, such that a voice query is considered the information source. For example, because many sign messages are short and voice messages may not be clear, module 512 or 522 may reformat a command into clear language to be queried from a vehicle occupant or a visual question answering (VQA) system. For example, the VQA acts to query camera images such as post processed data module 508 to determine whether the condition criterion portion is satisfied.

Additionally at module 512, an information source to provide information for evaluating a rule expiration criterion may be identified and classified as to a type of source to query to determine whether a rule is expired (i.e., to determine whether a rule is no longer valid). For example, a rule corresponding to a "No Turn on Red" sign would not be expired if the vehicle is at the traffic light/traffic sign location and the rule would be expired if the vehicle is not at the traffic light (e.g., the light was green or has turned green and the vehicle has turned right). The source to query to evaluate a rule expiration criterion for the "No Turn on Red" sign may therefore be a GPS sensor or GPSS to determine a location of the vehicle. As another example, a speed limit sign would be considered not expired until replaced by another detected speed limit sign and the existence of a subsequent speed limit sign would expire or invalidate the previous speed limit sign. A "No Parking" sign may have associated time limits, so a current time source may be a source to be queried to determine whether the associated rule has expired. Thus, a rule expiration class may be based on determining a current vehicle location, a time, or existence of an updated command (e.g., a new traffic sign detection or a new voice command).

Module 512 may also include a contradiction detection mechanism to detect if a contradiction exists between an actionable natural language command (e.g., the result portion of the generated rule) and any of the potential driving actions in the action space of the motion planner and to generate a corresponding mask for the command. This is achieved using natural language processing models. The contradiction detection mechanism compares a result portion of a rule (then part of if/then clause) to the action space of the motion planner and determines which potential driving actions from the action space of the motion planner should be prohibited (or have a corresponding selection probability decreased) and generates a corresponding mask for potential use in mask layer 422 of DNN 400 to represent any contradictions.

With reference to Table 1, in one example, the motion planning system has an action space that includes the following potential driving actions: park, stop, turn left, turn right, continue straight, and reduce speed. Various commands from traffic signs are received, including "No Parking", "No Turn on Red", and "Slow Down". For each different actionable command, each of the potential driving actions of the set of potential driving actions is evaluated and the contradiction detection mechanism acts to generate a probability that a contradiction exists. A generated mask may be either a hard mask or a soft mask, and each includes a mask parameter corresponding to each of the potential driving actions. With a hard mask, a mask parameter is set to zero for any contradicting potential driving action with a contradiction probability greater than a predetermined threshold (such as 0.5), while mask parameters for non-contradicting potential driving actions are set to one. With a soft mask, a mask parameter for any contradicting potential driving action will reduce a probability of that potential driving action from being selected according to a predetermined equation, as described below.

For example, a Park Here driving action has a high probability of being a contradiction to a "No Parking" sign. A "No Parking" sign has a corresponding rule that may be expressed as an if/then clause as: "if here, then don't park", so a hard mask parameter corresponding to the Park Here driving action may be set to zero (0). The other potential driving actions would be determined to have a low probability of being a contradiction to the No Parking sign, so their corresponding hard mask parameters may be set to one (1). A created hard mask for the No Parking sign would then include mask parameters for each of the potential driving actions, represented in the table as 011111. In another example, a soft mask may be generated. Mask parameters for a soft mask may be determined, for example, for each potential driving action, by subtracting its corresponding probability of being a contradiction from one (1). In that case, for the example probabilities listed for a No Parking sign, the soft mask would be:

[(1-0.848), (1-0.314), (1-0.125), (1-0.204), (1-0.048), (1-0.005)] or

[0.152, 0.686, 0.875, 0.796, 0.952, 0.995]

Using a generated mask having the soft mask parameters in the above form in the DNN 400 would act to decrease the probability that a potential driving action in conflict with the language command is selected as the driving action to operate the vehicle as compared to not using the generated mask.

Similarly, a right turn driving action and a left turn driving action have a high probability of being a contradiction to a "No Turn on Red" sign, so hard mask parameters corresponding to these potential driving actions may be set to zero (0). As another example, a right turn driving action, a left turn driving action, and a continue driving straight driving action have high probabilities of being a contradiction to a "Slow Down" sign, so hard mask parameters corresponding to these driving actions may be set to zero (0).

TABLE 1

| Traffic Sign Actionable Command | Predetermined driving actions | | | | | |
|---|---|---|---|---|---|---|
| | Park Here | Stop here temporarily | Make right turn | Make left turn | Continue driving straight ahead | Reduce speed | Created Hard Mask |
| No Parking | .848 | .314 | .125 | .204 | .048 | .005 | 011111 |
| No Turn on Red | .399 | .140 | .982 | .991 | .060 | .006 | 110011 |
| Slow down | .119 | .010 | .901 | (N/A) .911 | .932 | .002 | 110001 |

At module 514, for each rule of a plurality of rules, its condition criterion portion, result portion, corresponding rule expiration criterion, and generated mask are aggregated with a corresponding time and location stamp from module 510 for the rule and this information is stored at database 520.

For the rules stored in the database 520, a monitor module 518 may continuously keep track of a corresponding validity of each of the rules to determine when each expires. The monitor module 518 may monitor the rules on an ongoing basis (e.g., at each of a series of time steps) and discard any rules that have expired (e.g., remove them from the database 520). The rule expiration criterion may include a classification parameter based on a type of information source to be queried to determine when to expire a rule such that the monitor module 518 uses the corresponding information source to evaluate, for example, a current time, a current location of the vehicle, or a detection of a new traffic sign or voice command, to determine whether a rule meets its rule expiration criterion. Module 516 provides to module 518 information such as a current GPS location of the vehicle, a current time, or other information such as detection of another traffic sign or voice command that acts to expire a previous command and its corresponding rule.

Module 522 operates to continuously evaluate condition criterion portions of rules that are not expired by querying, for each unexpired rule at each of a series of time steps, an identified information source to determine whether a corresponding condition criterion portion of the rule is satisfied to determine whether a corresponding generated mask is applicable to the DNN 400. As an example, for a "No Turn on Red" sign, a camera image of the traffic light may be queried to determine whether the traffic light is red, and if so, the condition criterion portion is considered to be satisfied and the generated mask is considered to be applicable to the motion planner module. If the traffic light is not red, then the condition criterion portion is not satisfied and the mask is not applicable. A sensor data/map query may be employed to obtain condition criterion portion information from post processed module 508.

If the condition criterion portion is satisfied, then the corresponding generated mask for the rule is communicated to mask layer 422 to be used by DNN 400. In such a case, the DNN 400 can determine a motion planning decision with selection of an optimal driving action for the vehicle using the generated mask at mask layer 422 to decrease the probability of selection of a potential driving action which conflicts with the result portion of the rule. If the condition criterion portion of the rule is not satisfied, then a corresponding generated mask for the rule is not communicated to mask layer 422 and is not used in DNN 400; rather in such a case, a predetermined default mask having mask parameters that are all set to 1 may be used as the mask for mask layer 422.

Figure 5B:
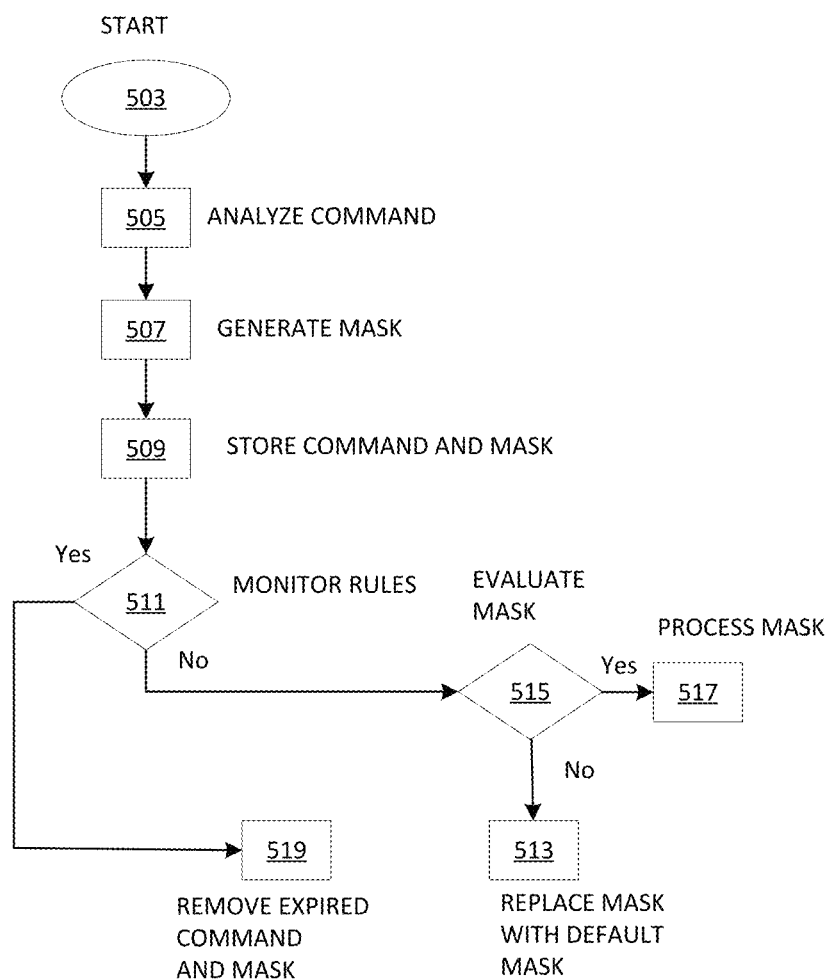
FIG. 5B is a flow diagram of an example process for generating a mask and using the mask in a reinforcement learning algorithm to make a motion planning decision.

FIG. 5B is a flow diagram of an example process executed by computing device 300 for generating a mask and using the mask in DNN 400 to make a motion planning decision using reinforcement learning. Steps 505, 507, and 509 of the process below are described with respect to a single natural language command, with the understanding that multiple commands can be processed independently for these steps. Each natural language command may have a corresponding generated mask that is applied at mask layer 422 if applicable. For each natural language command, the process begins at block 503 for each time step. Processing then proceeds to block 505.

At block 505, text data representing a natural language command is received and the text data is analyzed to generate logical command information including a rule and a rule expiration criterion, wherein the rule has an associated condition criterion portion and a result portion. Processing then proceeds to block 507.

At block 507, for the natural language command being processed, for each potential driving action of a set of potential driving actions of the vehicle, a corresponding contradiction probability related to whether the potential driving action contradicts the result portion of the rule is determined and a driving action mask is generated corresponding to the rule for the natural language command. For each potential driving action, the driving action mask includes a corresponding mask parameter based on the contradiction probability of the potential driving action. If the potential driving action contradicts the result portion of the rule, then the corresponding mask parameter acts to decrease a probability of selection of that potential driving action as an optimal driving action. Processing then proceeds to block 509.

At block 509, the logical command information and generated mask are stored with a corresponding time and location stamp in database 520 for the corresponding natural language command and processing proceeds to block 511.

At block 511, the rules added to the database 520 in the current or a previous time step are monitored. For each rule of the rules in the database at a current time step, a determination is made whether that rule is expired using its corresponding rule expiration criterion. If a rule is not expired, processing proceeds to block 515. If a rule is determined to be expired, processing proceeds to block 519.

At block 519, corresponding logical command information and the generated mask for any expired rules are removed from database 520.

At block 515, for each unexpired rule, at a current time step, the corresponding condition criterion portion of the rule is evaluated to determine whether the corresponding mask is applicable for the DNN 400. If the condition criterion portion of a rule is satisfied, the corresponding mask is applicable to the DNN 400, and processing proceeds to block 517.

At block 517, for each rule having a corresponding applicable driving action mask at a time step, that applicable driving action mask is provided to mask layer 422 of DNN 400 and is used to determine a motion planning decision for the vehicle. As noted previously, because more than one natural language command may be analyzed at a given time step, more than one mask may be applied to mask layer 422 of DNN 400 at a given time.

If a mask is not applicable to the DNN 400, then processing proceeds from block 515 to block 513.

At block 513, the generated mask is not communicated to mask layer 422 and is not used in mask layer 422. In such a case, a predetermined default mask, such as a hard mask with mask parameters set to one, may be used in mask layer 422 and no change occurs to the probabilities of selecting potential driving actions from the output of 415C to the output of mask layer 422 in DNN 400.

At a next time step, the process starts again at 503, and ends at one of steps 513, 517, or 519.

In other embodiments, rule expiration criterion may not need to be used for a rule because this determination may use the same information as needed to evaluate the condition criterion portion of the rule. For example, for a "No Parking" sign, the rule would be expired if the vehicle is no longer at the sign location and the condition criterion portion of the rule would not be satisfied (the mask is not applicable) when the vehicle is no longer at the sign location. In such an embodiment, block 511 may be omitted, and processing would proceed from block 509 to block 515.

Figure 6:
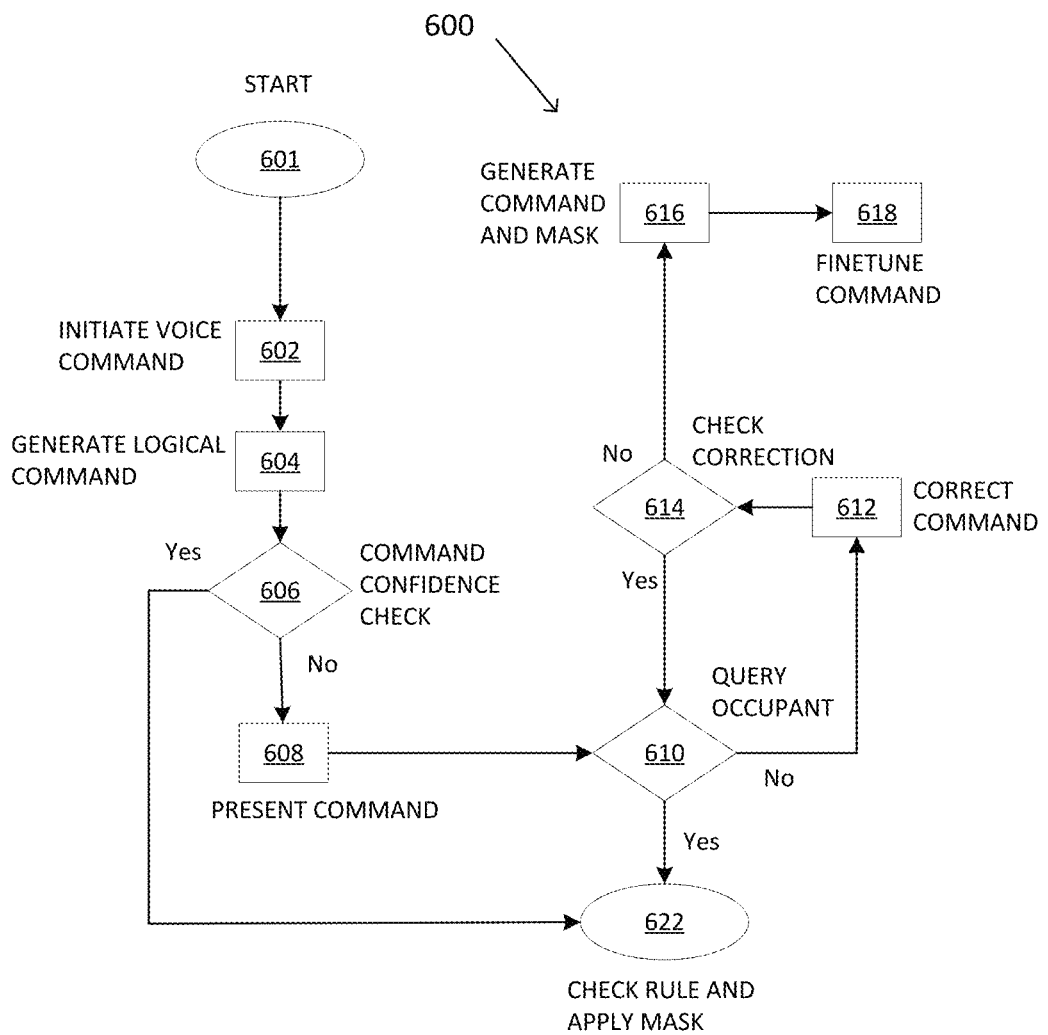
FIG. 6 is a flow diagram of an example algorithm for supervising voice commands.

FIG. 6 is a flow diagram of an example algorithm for supervision of voice commands. The process begins at block 601. Processing then proceeds to block 602.

At block 602, the processor 305 of computing device 300 receives an indication that a vehicle occupant is initiating a voice command and receives data indicative of the voice command. Processing then proceeds to block 604.

At block 604, using text data corresponding to the voice command, corresponding logical command information is generated for each voice command. Logical command information includes a corresponding rule condition criterion portion, a rule result portion, and a rule expiration criterion as previously described. In parallel, the semantics of the command may be detected using NLP tools such as sentence encoders to identify if the command is semantically similar to previously processed commands or sets of commands, from the vehicle operator and/or others, because different users may have different ways to express a command. A mask may be generated using the rule result portion of the rule. The logical command information may also include a source or type of source for obtaining data for evaluation of the rule expiration criterion and evaluation of the rule condition criterion. Processing then proceeds to block 606.

At block 606, a determination is made whether the system is confident about the generated logical command information (e.g., condition criterion portion, rule portion, rule expiration criterion, etc.). A first approach to evaluate confidence is based on command construction algorithms that determine how close the command is to a standard set of natural language commands or previously processed commands. This may be achieved by natural language processing techniques that include encoding semantics of each command (new and previously known or processed commands) as a vector, determining a distance between vectors of encoded semantics of the received command generated in block 604 and encoded semantics of other previously seen or standard commands, and indicating the determined distance as a confidence probability. If a vector of a new command is far from the other vectors, the system is less confident about the generated logical command information. The second approach is by using the probabilities generated by different NLP tools used in system 500. Those tools can output a probability, in addition to their main output, to indicate a confidence in the main output. The system can then determine, via comparing a probability to a predetermined threshold, whether the system is confident or not confident about the generated logical command information. If yes (confident) using one or both of the two approaches, then processing proceeds to block 622

At block 622, the rule expiration criterion and condition criterion portion of a rule can be evaluated and a generated mask can be applied or not applied as described above with respect to FIG. 5A and FIG. 5B. If not confident about the logical command information, processing proceeds to block 608.

At block 608, the logical command information may be presented to the vehicle occupant for confirmation, such as via the HMI (which may include a visual display or may include voice interactions) and processing proceeds to block 610.

At block 610, the vehicle occupant is queried as to whether the generated logical command information, or portions thereof, are correct and a response is received. If the response is yes, processing proceeds to block 622 where the rule expiration criterion and condition criterion portion of a rule can be evaluated and a generated mask can be applied or not applied as described above with respect to FIG. 5A and FIG. 5B. If the response is no, processing proceeds to block 612.

At block 612, the vehicle occupant is presented with an offer to correct the part that is incorrect and processing proceeds to block 614.

At block 614, a determination is made as to whether the vehicle occupant corrected the generated logical command information. If yes, processing proceeds back to block 610. If no, processing proceeds to block 616.

At block 616, the generated logical command information and corresponding generated mask are submitted to server 145 and processing proceeds to block 618.

At block 618, a logical command information generation algorithm for module 506 of FIG. 5A may be finetuned after enough samples are received by the server 145 and then a notification may be sent to the user and the algorithm may be updated.

Figure 7:
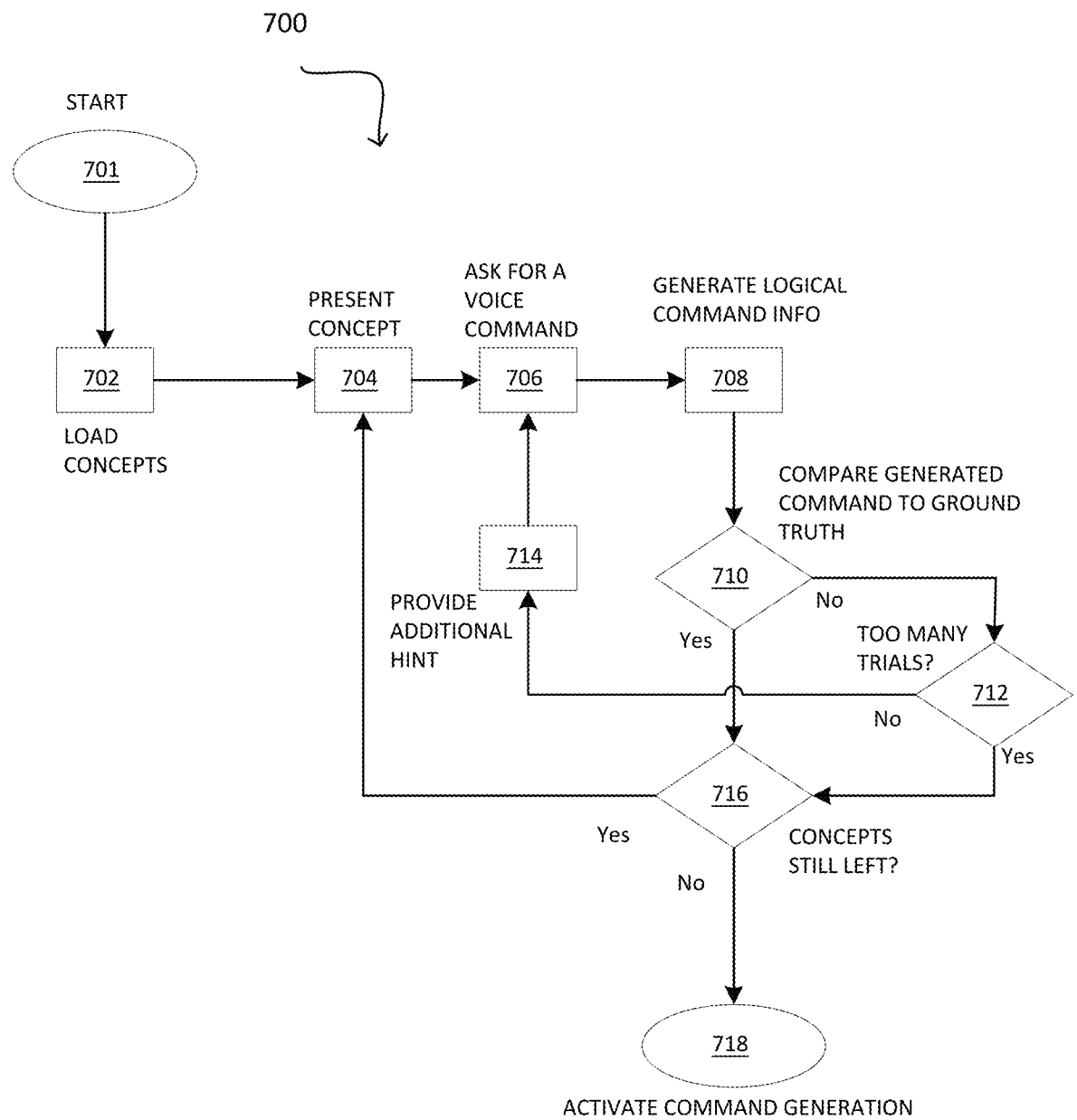
FIG. 7 is a flow diagram of an example of initializing an algorithm for generating logical command information for user voice commands.

FIG. 7 is a flow diagram of an example process for initializing an algorithm for generating logical command information for user voice commands to ensure that the automated driving system understands a specific vehicle occupant. For example, this may be performed for any new owner/user of the vehicle. The process begins at block 701. Processing then proceeds to block 702.

At block 702, a set of concepts for various voice commands are loaded to initialize an algorithm for voice calibration for the user. Different users have different ways to express a command and providing a set of concepts for different commands gives a user various opportunities to express them This may be useful for appropriate updates to the logical command information generation algorithm. In addition, the user may learn how to better command the system by trial and error prior to using it. Each concept includes a traffic situation and asks the user to command an action to the vehicle. For that purpose, the system may provide hints if user commands don't generate the appropriate logical command information. Processing then proceeds to block 704.

At block 704, a concept from the set of concepts is presented to the user via a human/machine interface, such as a display or use of voice interactions. Processing then proceeds to block 706.

At block 706, the user is asked to make a voice command using the concept presented. For example, one presented concept may be: "Suppose you are on the highway and you want to get gas at a particular gas station, such as a BP gas station—command the vehicle to do it." The user may say "Take the next exit if there is a BP gas station" which is a complete and correct command. The user may say "take the next exit" or "go to a gas station" or something else, which are not considered complete or correct commands. Processing then proceeds to block 708.

At block 708, logical command information is generated from the user's voice command and processing proceeds to block 710.

At block 710, the generated logical command information is compared to the correct logical command information (ground truth information) for the concept to identify whether the correct logical command information has been generated for the presented concept. If yes, processing proceeds to block 716. If not, processing proceeds to block 712.

At block 712, a determination is made whether too many trials have occurred for a given concept. If yes, processing proceeds to block 716. If no, processing proceeds to block 714.

At block 714, additional hints or description can be provided for the user for the presented concept and processing proceeds back to block 706 for an additional trial/iteration. In this manner, a user may be aided in formulating voice commands that the system is able to recognize and interpret correctly.

At block 716, a determination is made as to whether there are still concepts from the set of concepts to be processed. If yes, processing proceeds back to block 704. If no, processing proceeds to block 718.

At block 718, the logical command information generation algorithm for module 506 may be activated for the user once enough concepts have been successfully processed.

Otherwise, the system won't be activated, and a user may be requested to contact a dealership for further assistance. All information may be sent to the server 145 to provide possible updates to the logical command generation software. If a specific failure is reported for multiple users, the software may need to be updated.

In this manner, the vehicle motion planning system can be updated and customized for understanding voice commands from different users.

The motion planning system described above is advantageous in that it is scalable to incorporate and analyze natural language commands from traffic signs or vocal commands dynamically as they are encountered, such that a specific set of commands from traffic signs or voice commands need not be predetermined and the corresponding actions need not be hard-coded.

The description of the present disclosure is merely exemplary in nature and variations that do not depart from the gist of the present disclosure are intended to be within the scope of the present disclosure. Such variations are not to be regarded as a departure from the spirit and scope of the present disclosure.

In general, the computing systems and/or devices described may employ any of a number of computer operating systems, including, but by no means limited to, versions and/or varieties of the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain implementations, and should in no way be construed so as to limit the claims.

Accordingly, it is to be understood that the above description is intended to be illustrative and not restrictive. Many implementations and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future implementations. In sum, it should be understood that the invention is capable of modification and variation and is limited only by the following claims.

All terms used in the claims are intended to be given their plain and ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A system for motion planning for a vehicle having an advanced driver assistance system which includes a processor and a memory, the memory including instructions such that the processor is programmed to:
   receive, from sensors disposed on the vehicle, image data that includes text data related to an environment surrounding the vehicle;
   analyze the text data representing a natural language command related to the environment of the vehicle to generate a rule with an associated condition criterion portion and a result portion;
   determine, for each potential driving action of a set of potential driving actions of the vehicle, whether the potential driving action contradicts the result portion of the rule;
   generate a driving action mask that includes, for each potential driving action of the set of potential driving actions of the vehicle, a corresponding mask parameter, wherein, if the potential driving action contradicts the result portion of the rule, then the corresponding mask parameter acts to decrease a probability of selection of that potential driving action in a motion planning decision;
   evaluate the condition criterion portion to determine whether the mask is applicable;
   if the mask is applicable, use the driving action mask to determine a motion planning decision for the vehicle; and
   command the advanced driver assistance system to execute the motion planning decision to autonomously control the vehicle.

2. The system of claim 1, wherein the processor is further programmed to:
   generate a rule expiration criterion for the rule; and
   determine, prior to evaluating the condition criterion portion, whether the rule is expired using the rule expiration criterion, wherein the condition criterion portion is not evaluated if the rule is expired.

3. The system of claim 2, wherein the processor is further programmed to:
   store the rule in a database with a corresponding time and location stamp and an information source to be queried to acquire expiration information relevant to the rule expiration criterion; and wherein to determine whether the rule is expired includes querying the information source to obtain the expiration information.

4. The system of claim 3, wherein the processor is further programmed to:
   store a plurality of rules in the database, wherein each rule of the plurality of rules includes a corresponding rule expiration criterion and is stored with a corresponding time and location stamp and a corresponding classification parameter to indicate a corresponding information source to be queried to acquire expiration information relevant to the corresponding rule expiration criterion, wherein an information source is a module that indicates a current time, a module that indicates a current location of the vehicle, or a module that detects a superseding command; and
   monitor, for each rule of the plurality of rules, the corresponding rule expiration criterion on an on-going basis to determine whether the rule is expired, wherein to determine whether a rule is expired includes querying the corresponding information source indicated by the corresponding classification parameter to obtain corresponding expiration information.

5. The system of claim 1, wherein the condition criterion portion is classified according to an information source to be queried to acquire condition information to evaluate the condition criterion portion, wherein an information source to be queried includes a module for determining a vehicle location, a map, a vehicle occupant, or a module of the vehicle interpreting a sensor signal, and wherein the processor is further programmed to query the information source to evaluate the condition criterion portion to determine whether the mask is applicable.

6. The system of claim 1, wherein the processor is further programmed to:
   receive, from a vehicle sensor, sign image data representing a traffic sign in the environment of the vehicle; and
   analyze the sign image data to generate the text data.

7. The system of claim 1, wherein the processor is further programmed to:
   receive, from a vehicle sensor, voice data representing a voice command from a vehicle occupant; and
   generate the text data from the voice data, wherein at least one of the text data and the rule is confirmed by querying the vehicle occupant.

8. The system of claim 1, wherein using the driving action mask to determine a motion planning decision for the vehicle includes using a reinforcement learning algorithm to select an optimal driving action from the set of potential driving actions for the vehicle and wherein the vehicle is operated according to the selected optimal driving action.

9. The system of claim 1, wherein the set of potential driving actions for the vehicle includes at least one of: a park action, a stop action, a turn right action, a turn left action, a drive straight action, an increase vehicle speed action, and a decrease vehicle speed action.

10. A system for motion planning for a vehicle having an advanced driver assistance system which includes a computer including a processor and a memory, the memory including instructions such that the processor is programmed to:
receive text data from data sent by sensors disposed on the vehicle, the text data representing a natural language command related to an observation space of the vehicle from a traffic sign or vocal command;
analyze the text data to generate a rule and a rule expiration criterion, wherein the rule includes a condition criterion portion and a result portion;
determine, for each potential driving action of a set of potential driving actions of the vehicle, a corresponding contradiction probability related to whether the potential driving action contradicts the result portion of the rule;
generate a driving action mask that includes, for each potential driving action of the set of potential driving actions of the vehicle, a corresponding mask parameter based on the corresponding contradiction probability of the potential driving action;
evaluate the rule expiration criterion to determine whether the rule is not expired;
evaluate the condition criterion portion to determine whether the mask is applicable;
if the rule is not expired and the mask is applicable, then communicate the generated driving action mask to a neural network to select an optimal driving action from the set of potential driving actions for the vehicle using the driving action mask; and
command the advanced driver assistance system to execute the optimal driving action to autonomously control the vehicle.

11. The system of claim 10, wherein the processor is further programmed to:
supervise an algorithm for generating logical command information from voice commands of a user by generating corresponding first logical command data and providing the user an opportunity to verify or correct the first logical command data.

12. The system of claim 10, wherein the processor is further programmed to:
initialize an algorithm for generating logical command information from voice commands of a user by using a set of concepts related to a set of saved commands each with corresponding saved logical command information, wherein for each concept of the set of concepts, the user is instructed to express the concept as a voice command, the algorithm generates a first logical command data by analyzing the voice command from the user, and the first logical command data is compared to the saved logical command information for the concept.

13. A method for motion planning for a vehicle having an advanced driver assistance system (ADAS), the method comprising:
analyzing, using the ADAS, text data representing a natural language command related to an environment of the vehicle to generate a rule with an associated condition criterion portion and a result portion;
determining, using the ADAS, for each potential driving action of a set of potential driving actions of the vehicle, whether the potential driving action contradicts the result portion of the rule;
generating, using the ADAS, a driving action mask that includes, for each potential driving action of the set of potential driving actions of the vehicle, a corresponding mask parameter, wherein, if the potential driving action contradicts the result portion of the rule, then the corresponding mask parameter acts to decrease a probability of selection of that potential driving action in a motion planning decision;
evaluating, using the ADAS, the condition criterion portion to determine whether the mask is applicable;
if the mask is applicable, using the driving action mask to determine a motion planning decision for the vehicle; and
commanding the ADAS to execute the motion planning decision to autonomously control the vehicle.

14. The method of claim 13, further comprising:
generating a rule expiration criterion for the rule; and
determining, prior to evaluating the condition criterion portion, whether the rule is expired using the rule expiration criterion, wherein the condition criterion portion is not evaluated if the rule is expired.

15. The method of claim 14, further including:
storing the rule in a database with a corresponding time and location stamp and an information source to be queried to acquire expiration information relevant to the rule expiration criterion; and wherein determining whether the rule is expired includes querying the information source to obtain the expiration information.

16. The method of claim 15, further including:
storing a plurality of rules in the database, wherein each rule of the plurality of rules includes a corresponding rule expiration criterion and is stored with a corresponding time and location stamp and a corresponding classification parameter to indicate a corresponding information source to be queried to acquire expiration information relevant to the corresponding rule expiration criterion, wherein an information source is a module that indicates a current time, a module that indicates a current location of the vehicle, or a module that detects a superseding command; and
monitoring, for each rule of the plurality of rules, the corresponding rule expiration criterion on an on-going basis to determine whether the rule is expired, wherein to determine whether a rule is expired includes querying the corresponding information source indicated by the corresponding classification parameter to obtain corresponding expiration information.

17. The method of claim 13, wherein the condition criterion portion is classified according to an information source to be queried to acquire condition information to evaluate the condition criterion portion, wherein an information source to be queried includes a module for determining a vehicle location, a map, a vehicle occupant, or a module of the vehicle interpreting a sensor signal, and wherein the processor is further programmed to query the information source to evaluate the condition criterion portion to determine whether the mask is applicable.

18. The method of claim 13, further including:
receiving, from a vehicle sensor, sign image data representing a traffic sign in the environment of the vehicle; and
analyzing the sign image data to generate the text data.

19. The method of claim 13, further including:
receiving, from a vehicle sensor, voice data representing a voice command from a vehicle occupant; and generating the text data from the voice data, wherein at least one of the text data and the rule is confirmed by querying the vehicle occupant.

20. The method of claim 13, wherein using the driving action mask to determine a motion planning decision for the vehicle includes using a reinforcement learning algorithm to select an optimal driving action from the set of potential driving actions for the vehicle and wherein the vehicle is operated according to the selected optimal driving action.

\* \* \* \* \*